United States Patent
Higashi et al.

(10) Patent No.: US 11,931,709 B2
(45) Date of Patent: Mar. 19, 2024

(54) APPARATUS FOR MIXING MATERIALS DISSOLVED IN A HIGH-PRESSURE WORKING FLUID

(71) Applicant: KOBE STEEL, LTD., Hyogo (JP)

(72) Inventors: Kosuke Higashi, Hyogo (JP); Kazuhisa Fukutani, Hyogo (JP)

(73) Assignee: KOBE STEEL, LTD., Hyogo (JP)

( * ) Notice: Subject to any disclaimer, the term of this patent is extended or adjusted under 35 U.S.C. 154(b) by 973 days.

(21) Appl. No.: 16/760,650

(22) PCT Filed: Oct. 24, 2018

(86) PCT No.: PCT/JP2018/039569
§ 371 (c)(1),
(2) Date: Apr. 30, 2020

(87) PCT Pub. No.: WO2019/093130
PCT Pub. Date: May 16, 2019

(65) Prior Publication Data
US 2020/0330940 A1 Oct. 22, 2020

(30) Foreign Application Priority Data
Nov. 7, 2017 (JP) ................. 2017-215005

(51) Int. Cl.
*B01F 35/71* (2022.01)
*B01F 21/20* (2022.01)
(Continued)

(52) U.S. Cl.
CPC ........ *B01F 35/71805* (2022.01); *B01F 21/20* (2022.01); *B01F 23/09* (2022.01);
(Continued)

(58) Field of Classification Search
CPC .......... B01F 35/71; B01F 21/20; B01F 23/09; B01F 23/043; B01F 33/71; B01F 35/2113;
(Continued)

(56) References Cited

U.S. PATENT DOCUMENTS

| 4,478,705 A | * | 10/1984 | Ganguli | ............ B01D 11/0407 208/59 |
| 4,824,570 A | * | 4/1989 | Bethuel | ............ B01D 11/0203 210/511 |

(Continued)

FOREIGN PATENT DOCUMENTS

| EP | 3 708 323 A1 | 9/2020 |
| JP | H05-184896 A | 7/1993 |

(Continued)

OTHER PUBLICATIONS

Sameer P. Nalawade et al.; "Prediction of the viscosity reduction due to dissolved CO2 of and an elementary approach in the supercritical CO2 assisted continuous particle production of a polyester resin"; Powder Technology; Elsevier, vol. 170, No. 3, Dec. 14, 2006, pp. 143-152.

(Continued)

*Primary Examiner* — Charles Cooley
(74) *Attorney, Agent, or Firm* — Studebaker & Brackett PC (57) ABSTRACT

The present invention relates to a mixing apparatus. A production unit produces a working fluid that is in a supercritical state or a subcritical state. A storage unit stores a material. A dissolving unit dissolves the material in the working fluid. A mixer mixes the material together in the presence of the working fluid. A material feed valve opens or closes a flow passage through which the material is to pass to be fed from the storage unit into the dissolving unit. A working fluid inflow valve opens or closes a flow passage (Continued)

through which the working fluid is to pass to flow into the dissolving unit from the production unit. A mixer inflow valve opens or closes a flow passage through which the working fluid and the material are to pass to flow into the mixer from the dissolving unit.

20 Claims, 5 Drawing Sheets

(51) Int. Cl.
*B01F 23/00* (2022.01)
*B01F 35/75* (2022.01)
*B29B 7/14* (2006.01)
*B29B 7/20* (2006.01)
*B29B 7/86* (2006.01)
*B29C 31/04* (2006.01)

(52) U.S. Cl.
CPC .......... *B01F 35/71* (2022.01); *B01F 35/7547* (2022.01); *B29B 7/14* (2013.01); *B29B 7/20* (2013.01); *B29B 7/86* (2013.01); *B29C 31/04* (2013.01)

(58) Field of Classification Search
CPC ...... B01F 35/2115; B01F 21/00; B01F 23/00; B01F 27/61; B01F 27/72; B01F 33/70; B01F 35/20; B01F 33/84; B01F 2101/2805; B29B 7/14; B29B 7/20; B29B 7/86; B29B 7/726; B29B 7/748; B29B 7/7495; B29B 7/823; B29B 7/826; B29B 7/94; B29B 7/325; B29B 13/00; B29B 7/00; B29B 7/28; B29B 7/42; B29B 7/72; B29B 7/801; B29C 31/04; B29C 31/00
See application file for complete search history.

(56) References Cited

U.S. PATENT DOCUMENTS

| | | | | |
|---|---|---|---|---|
| 4,898,673 A * | 2/1990 | Rice | ................... | B01D 11/0203 554/8 |
| 5,066,522 A * | 11/1991 | Cole | ................... | B29B 7/748 427/422 |
| 5,088,443 A * | 2/1992 | Hastings | ................ | B05D 1/025 118/314 |
| 5,105,843 A * | 4/1992 | Condron | ................. | B29B 7/325 285/133.11 |
| 5,106,650 A * | 4/1992 | Hoy | ................... | C09D 7/00 239/3 |
| 5,108,799 A * | 4/1992 | Hoy | ................... | C09D 7/00 427/422 |
| 5,171,089 A * | 12/1992 | Kuo | ................... | B29B 7/86 366/162.3 |
| 5,205,987 A * | 4/1993 | Ashraf-Khorassani | ................ | G01N 7/04 422/68.1 |
| 5,254,260 A * | 10/1993 | Nielsen | ................. | B05D 1/025 210/651 |
| 5,304,390 A * | 4/1994 | Condron | ................. | B01F 35/83 118/663 |
| 5,306,350 A * | 4/1994 | Hoy | ................... | B05B 7/32 134/22.14 |
| 5,308,648 A * | 5/1994 | Prince | ................... | C08J 3/2053 427/427 |
| 5,330,783 A * | 7/1994 | Saidman | ................ | B29B 7/728 427/427.4 |
| 5,399,597 A * | 3/1995 | Mandel | ................... | C09D 5/03 |
| 5,455,076 A * | 10/1995 | Lee | ................... | G05D 11/131 137/98 |
| 5,466,490 A * | 11/1995 | Glancy | ................... | C09D 7/20 427/483 |
| 5,698,163 A * | 12/1997 | Mandel | ................. | G05D 21/02 422/111 |
| 5,766,522 A * | 6/1998 | Daly | ................... | C09D 5/03 264/13 |
| 5,993,747 A * | 11/1999 | Mandel | ................ | B01J 19/0006 422/111 |
| 6,075,074 A * | 6/2000 | Daly | ................... | B05D 1/025 523/333 |
| 6,114,414 A * | 9/2000 | Daly | ................... | B01J 2/006 523/333 |
| 6,583,187 B1 * | 6/2003 | Daly | ................... | B29B 7/826 521/61 |
| 6,871,656 B2 * | 3/2005 | Mullee | ................... | G03F 7/422 257/E21.255 |
| 7,175,716 B2 * | 2/2007 | Tunnicliffe | ............ | C10G 21/00 134/40 |
| 8,747,931 B2 * | 6/2014 | DeLine | ................... | A23L 7/115 426/601 |
| 11,266,959 B2 * | 3/2022 | Bayer | ............... | B01F 35/21112 |
| 2017/0076825 A1 * | 3/2017 | Lacalle Bayo | ......... | B01F 21/10 |
| 2019/0009239 A1 * | 1/2019 | Chang | ................. | B01J 19/0006 |

FOREIGN PATENT DOCUMENTS

| | | | | |
|---|---|---|---|---|
| JP | 2005-007293 A | | 1/2005 | |
| JP | 2005-103461 A | | 4/2005 | |
| JP | 2006-159165 A | | 6/2006 | |
| JP | 5259203 B2 | | 8/2013 | |
| JP | 2013-202565 A | | 10/2013 | |
| JP | 2019-084763 A | | 6/2019 | |
| JP | 2019084499 A | * | 6/2019 | ............... B01F 1/00 |
| WO | WO-2006057374 A1 | * | 6/2006 | ............ B01F 3/0853 |
| WO | WO-2017141467 A1 | * | 8/2017 | ......... B01F 13/0059 |
| WO | WO-2019093130 A1 | * | 5/2019 | ............... B01F 1/00 |

OTHER PUBLICATIONS

The extended European search report issued by the European Patent Office dated Jan. 20, 2021, which corresponds to European Patent Application No. 18877174.5-1014 and is related to U.S. Appl. No. 16/760,650.

International Search Report issued in PCT/JP2018/039569; dated Jan. 29, 2019.

Written Opinion issued in PCT/JP2018/039569; dated Jan. 29, 2019.

* cited by examiner

APPARATUS FOR MIXING MATERIALS DISSOLVED IN A HIGH-PRESSURE WORKING FLUID

TECHNICAL FIELD

The present disclosure relates to a mixing apparatus for mixing materials together.

BACKGROUND ART

For example, Patent document 1 discloses mixing (the term "kneading" is used in this document) materials (called "rubber materials" in the document) in the presence of a supercritical fluid or a subcritical fluid (refer to paragraph 0040 of the document).

CITATION LIST

Patent Literature

Patent document 1: Japanese Patent No. 5,259,203

SUMMARY OF INVENTION

Technical Problem

In this technique, materials are dissolved in a supercritical fluid or a subcritical fluid. The pressure of the supercritical fluid or subcritical fluid (hereinafter referred to as a "working fluid") is higher than atmospheric pressure. It is therefore expected that the materials are applied (through pressure) to the working fluid by applying, to the materials, a pressure that is higher than a pressure of the working fluid. This may raise a problem that large energy is necessary to apply the materials to the working fluid.

In view of the above, an object of the present disclosure is to provide a mixing apparatus capable of suppressing energy that is necessary to apply materials to a working fluid.

Solution to Problem

A mixing apparatus according to the present disclosure includes a production unit, a storage unit, a dissolving unit, a mixer, a material feed valve, a working fluid inflow valve, and a mixer inflow valve. The production unit produces a working fluid that is in a supercritical state or a subcritical state. The storage unit stores a material. The working fluid and the material are fed into the dissolving unit and the dissolving unit dissolves the material in the working fluid. The mixer mixes the material together in the presence of the working fluid. The material feed valve opens or closes a flow passage through which the materials are to pass to be fed from the storage unit into the dissolving unit. The working fluid inflow valve opens or closes a flow passage through which the working fluid is to pass to flow into the dissolving unit from the production unit. The mixer inflow valve opens or closes a flow passage through which the working fluid and the materials is to pass to flow into the mixer from the dissolving unit.

Advantageous Effects of Invention

The above configuration makes it possible to suppress energy that is necessary to apply materials to a working fluid.

DESCRIPTION OF EMBODIMENTS

A mixing apparatus 1 according to a first embodiment is described with reference to FIG. 1 to FIG. 3.

Figure 1:
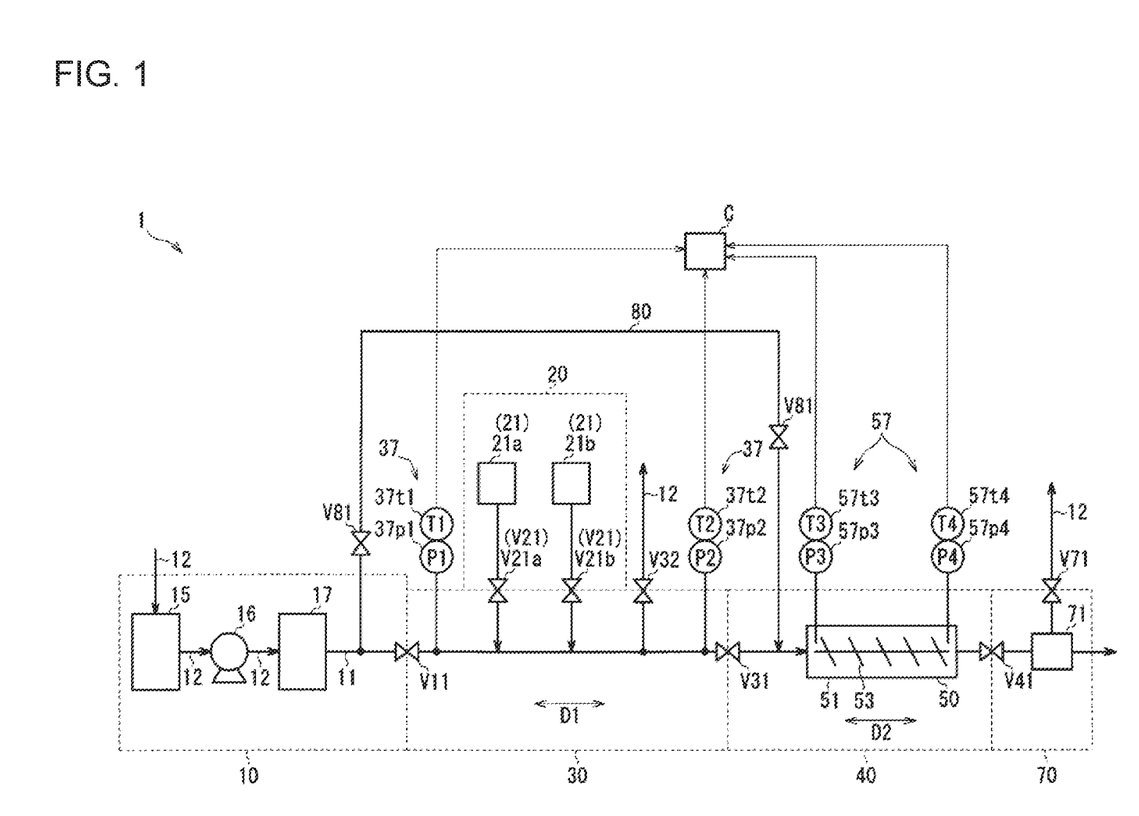
FIG. 1 is a block diagram of a mixing apparatus according to a first embodiment.

The mixing apparatus 1 (kneading apparatus, stirring apparatus) is an apparatus for mixing materials 21 using a working fluid 11, as shown in FIG. 1. The term "mixing" used above includes kneading and stirring. The mixing apparatus 1 includes a production unit 10, a storage unit 20, a dissolving unit 30, a mixing unit 40, a separation unit 70, a branch flow passage 80, and a control unit C.

The production unit 10 (supercritical production unit, subcritical production unit) is a unit for producing the working fluid 11. The working fluid 11 is a fluid in a supercritical state (supercritical fluid) or a fluid in a subcritical state (subcritical fluid). The mixing apparatus 1 is a supercritical mixing apparatus or a subcritical mixing apparatus. The temperature and the pressure of the supercritical fluid are higher than or equal to a critical temperature (Tc) and a critical pressure (Pc), respectively. The supercritical fluid has characteristics of a liquid and a gas. The supercritical fluid has an ability to melt a solute like a liquid does (dissolving ability) and an ability to diffuse a solute like a gas does (diffusing ability). The characteristics (dissolving ability and diffusing ability) of the subcritical fluid are approximately the same as those of the supercritical fluid. For example, the temperature T and the pressure P of the subcritical fluid satisfy one of the following sets of conditions. The unit of temperatures T and critical temperatures Tc in the following examples is ° C. Example 1 of subcritical state: T≥Tc and P<Pc. Example 2 of subcritical state: T<Tc, P<Pc, T being sufficiently higher than room temperature, and P being sufficiently higher than normal pressure (atmospheric pressure). Examples 3 of subcritical state: 0.5<T/Tc<1.0 and 0.5<P/Pc. Example 4 of subcritical state: 0.5<T/Tc and 0.5<P/Pc<1.0. Example 5 of subcritical state: 0.5<P/Pc when the critical temperature Tc is lower than or equal to 0° C.

It is preferable that the substances constituting the working fluid 11 be substances that can be rendered in the supercritical fluid or the subcritical fluid as easily as possible. The difference between the polarity of the working fluid 11 and that of the materials 21 is so small that the materials 21 can be dissolved in the working fluid 11. The substance that constitutes the working fluid 11 is carbon dioxide, for example. The critical temperature of carbon dioxide is 31° C. The critical pressure of carbon dioxide is 7.4 MPa. For example, carbon dioxide is in a subcritical state when its temperature is higher than or equal to 31° C. and its pressure is higher than or equal to 7.1 MPa. When its temperature is 20° C., carbon dioxide is in a subcritical state if its pressure is higher than or equal to 15 MPa. The substance that constitutes the working fluid 11 need not always be carbon dioxide and may be nitrogen or may be water, for example. In the following, the term "supercritical state or the like" may be used instead of the term "supercritical state or subcritical state." The working fluid 11 is rendered in a supercritical state or the like when the materials 21 are dissolved in the working fluid 11 in the dissolving unit 30 and when the materials 21 are mixed together in a mixer 50 in the presence of the working fluid 11. The working fluid 11 that is not in a supercritical state or the like (e.g., it is in the form of gas or liquid) is also referred to as a "fluid 12."

It is preferable that the working fluid 11 be in a supercritical state rather than a subcritical state. The materials 21 are mixed together more thoroughly when the working fluid 11 is in a supercritical state than when it is in a subcritical state. For example, where the materials 21 include a rubber (main material 21a described below), the quality of a rubber product (e.g., V-belt) manufactured through mixing by the mixing apparatus 1 may be evaluated by the wear rate of the rubber product. In this evaluation method, the wear rate increases (the quality degrades) in order of a case that the working fluid 11 being in a supercritical state is used, a case that the working fluid 11 being in a subcritical state is used, and a case that a fluid 12 at atmospheric pressure is used. For example, the production unit 10 includes a cooler 15, a pump 16, a heater 17, and a working fluid inflow valve V11. Valves such as the working fluid inflow valve V11 is described after the description of constituent elements other than the valves.

The cooler 15 (heat exchanger) converts the fluid 12 into a liquid by cooling a gas-form fluid 12. Where the fluid 12 is carbon dioxide, the cooler 15 converts a carbon dioxide gas at atmospheric pressure (0.1 MPa), for example, into a liquid.

The pump 16 sends out the working fluid 11 (causes it to flow). The pump 16 increases the pressure of a liquid-form fluid 12. Where the pump 16 increases the pressure of a liquid-form fluid 12, the size of the pump 16 can be made smaller than in a case that it increases the pressure of a gas-form fluid 12. Where the fluid 12 is carbon dioxide, the pump 16 increases its pressure to 2 to 3 MPa, for example.

The heater 17 (heat exchanger) evaporates the fluid 12 by heating a liquid-form fluid 12. The heater 17 pressurizes the fluid 12 by evaporating it in a container. As a result, the fluid 12 is rendered in a supercritical state or a subcritical state. Where the fluid 12 is carbon dioxide, the heater 17 pressurizes the fluid 12 to 7 to 8 MPa, for example.

The storage unit 20 (material storage unit) is a unit for storing materials 21. The storage unit 20 has outlets through which materials 21 are fed into the dissolving unit 30. The storage unit 20 includes material feed valves V21. The materials 21 include plural kinds of materials. For example, the materials 21 include a main material 21a (main row material) and an auxiliary material 21b (auxiliary row material, additive agent, additive). The main material 21a includes a polymeric material, for example. The main material 21a includes a rubber or a resin. The auxiliary material 21b is a filler, for example. The auxiliary material 21b may include an inorganic substance or an organic substance. For example, the auxiliary material 21b may include a plant-origin material, or cellulose nanofiber or the like. For example, the mixing apparatus 1 is a rubber mixing (kneading) apparatus, a resin mixing (kneading) apparatus, or the like. The materials 21 may not include a polymeric material. The materials 21 may be materials used for food, cosmetics, or medicine.

The dissolving unit 30 (material feed portion) is a unit for dissolving the materials 21 in the working fluid 11. The materials 21 and the working fluid 11 are put into the dissolving unit 30. The materials 21 are fed into the dissolving unit 30 from the storage unit 20. The working fluid 11 flows into the dissolving unit 30 from the production unit 10. Then the materials 21 are dissolved in the working fluid 11 in the dissolving unit 30.

The dissolving unit 30 has an entrance-side portion and an exit-side portion. The entrance-side portion is a portion that is located upstream of the center of the dissolving unit 30 in a flow direction D1. The flow direction D1 is a direction of the working fluid 11 and the materials 21 when they flow from the dissolving unit 30 to the mixing unit 40. The term "upstream" means the source side of a flow of the working fluid 11 and the materials 21 (likewise, the term "downstream" means destination side of a flow of the working fluid 11 and the materials 21). The exit-side portion is a portion that is located downstream of the center of the dissolving unit 30 in the flow direction D1. As a result, the length of each of the entrance-side portion and the exit-side portion in the flow direction D1 is equal to ½ of the overall length of the dissolving unit 30 in the flow direction D1. The length of at least one of the entrance-side portion and the exit-side portion in the flow direction D1 may be shorter than or equal to ⅓, ⅕, or ¹⁄₁₀ of the overall length of the dissolving unit 30 in the flow direction D1. The dissolving unit 30 includes dissolving unit sensors 37 and a mixer inflow valve V31.

The dissolving unit sensors 37 detect a state of the inside (flow passage) of the dissolving unit 30. The dissolving unit sensors 37 are used for detecting a state of the working fluid 11 (i.e., whether it is in a supercritical state or a subcritical state). The dissolving unit sensors 37 may be used for detecting an amount (presence/absence, mixing state) of the materials 21 in the dissolving unit 30. The dissolving unit sensors 37 include a pressure gauge and a thermometer. The dissolving unit sensors 37 include a dissolving unit entrance pressure gauge 37p1 (dissolving unit pressure gauge), a dissolving unit exit pressure gauge 37p2 (dissolving unit pressure gauge), a dissolving unit entrance thermometer 37t1 (dissolving unit thermometer), and a dissolving unit exit thermometer 37t2 (dissolving unit thermometer). The dissolving unit entrance pressure gauge 37p1 detects a pressure P1 at the entrance-side portion of the inside of the dissolving unit 30. The dissolving unit exit pressure gauge 37p2 detects a pressure P2 at the exit-side portion of the inside of the dissolving unit 30. The dissolving unit entrance thermometer 37t1 detects a temperature T1 at the entrance-side portion of the inside of the dissolving unit 30. The dissolving unit exit thermometer 37t2 detects a temperature T2 at the exit-side portion of the inside of the dissolving unit 30. Another dissolving unit pressure gauge may be provided between the dissolving unit entrance pressure gauge 37p1 and the dissolving unit exit pressure gauge 37p2 (in the flow direction D1). Another dissolving unit thermometer may be provided between the dissolving unit entrance thermometer 37t1 and the dissolving unit exit thermometer 37t2.

The mixing unit 40 (kneading unit, stirring unit) is a unit for mixing the materials 21 together. The mixing unit 40 is provided downstream of the dissolving unit 30. The mixing unit 40 includes a mixer 50 and a degree-of-opening adjustment valve V41.

The mixer 50 (kneader, stirrer) mixes the materials 21 together in the presence of the working fluid 11 being in a supercritical state or a subcritical state (supercritical atmosphere or subcritical atmosphere). The mixer 50 mixes the main material 21a and the auxiliary material 21b together. Since this mixing is performed in the presence of the working fluid 11 being in a supercritical state or the like, the dispersion of the auxiliary material 21b and the mixing of the main material 21*a* and the auxiliary material 21*b* are accelerated more than in a case that they are mixed together in the presence of the fluid 12 that is not in a supercritical state or the like.

The mixer 50 (i.e., chamber 51 described below) has an entrance-side portion and an exit-side portion. The entrance-side portion is a portion located upstream of the center of the mixer 50 in a flow direction D2. The flow direction D2 is the direction of a straight line that passes through the entrance and the exit of the mixer 50. The exit-side portion is a portion located downstream of the center of the mixer 50 in the flow direction D2. As a result, the length of each of the entrance-side portion and the exit-side portion in the flow direction D2 is ½ of the overall length of the mixer 50 in the flow direction D2. The length of at least one of the entrance-side portion and the exit-side portion in the flow direction D2 may be shorter than or equal to ⅓, ⅕, or 1/10 of the overall length of the mixer 50 in the flow direction D2. The mixer 50 includes a chamber 51, a mixing blade 53, and mixer sensors 57.

The chamber 51 is a container in which the materials 21 are mixed together. A flow passage (mixing flow passage) for the working fluid 11 and the materials 21 is formed inside the chamber 51.

The mixing blade 53 (kneading blade, stirring blade) is a blade for mixing the materials 21 together. The materials 21 are mixed together because shearing force acts on the materials 21 between the mixing blade 53 and the inner surface (wall surface) of the chamber 51. The mixing blade 53 is provided in the chamber 51. The mixing blade 53 may rotate with respect to the chamber 51 (i.e., it may be a rotary blade). In this case, the mixing blade 53 pushes out (carries) the working fluid 11 and the materials 21 downstream. The mixing blade 53 may be fixed to the chamber 51 (i.e., it may be a mixing blade of a static mixer and may be a non-rotary blade). In this case, the working fluid 11 and the materials 21 flow along the mixing blade 53 and becomes a swirling flow, for example. Either only one mixing blade 53 or plural mixing blades 53 may be provided.

As shown in FIG. 1, the mixer sensors 57 detect inside states of the mixer 50. The mixer sensors 57 are used for detecting a state of the working fluid 11 (i.e., whether it is in a supercritical state or a subcritical state). The mixer sensors 57 may be used for detecting an amount (presence/absence, mixing state) of the materials 21 in the mixer 50. The mixer sensors 57 may be used for controlling (adjusting) the flow rate Q of the working fluid 11 and the materials 21 in the mixer 50. The mixer sensors 57 include pressure gauges and thermometers. The mixer sensors 57 include a mixer entrance pressure gauge 57*p*3 (mixer pressure gauge), a mixer exit pressure gauge 57*p*4 (mixer pressure gauge), a mixer entrance thermometer 57*t*3 (mixer thermometer), and a mixer exit thermometer 57*t*4 (mixer thermometer). The mixer entrance pressure gauge 57*p*3 detects a pressure P3 at the entrance-side portion of the mixer 50. The mixer exit pressure gauge 57*p*4 detects a pressure P4 at the exit-side portion of the mixer 50. The mixer entrance thermometer 57*t*3 detects a temperature T3 at the entrance-side portion of the mixer 50. The mixer exit thermometer 57*t*4 detects a temperature T4 at the exit-side portion of the mixer 50. Another mixer pressure gauges may be provided between the mixer entrance pressure gauge 57*p*3 and the mixer exit pressure gauge 57*p*4 (in the flow direction D2). Another mixer pressure gauges may be provided between the mixer entrance thermometer 57*t*3 and the mixer exit thermometer 57*t*4.

The separation unit 70 is a unit for separating the working fluid 11 (fluid 12) from the materials 21 dissolved in the working fluid 11. The separation unit 70 is provided downstream of the mixing unit 40, the mixer 50, and the degree-of-opening adjustment valve V41. The separation unit 70 includes a separator 71 and a pressure adjustment valve V71.

The separator 71 separates the working fluid 11 from the materials 21 (devolatilization). The separator 71 separates the working fluid 11 from the materials 21 by lowering the pressure of the working fluid 11 and the materials 21 and thereby vaporizing the working fluid 11 (turning it to a gas-form fluid 12). As a result, the separator 71 deposits materials 21. The separator 71 ejects materials 21 from an opening/closing portion (lids, opening portion; not shown). The materials 21 ejected from the separator 71 are transported to the next process. The next process is a process to be executed next to the process that is executed using the mixing apparatus 1. For example, the apparatus of the next process may be an apparatus for manufacturing pellets (i.e., pelletizer) or an apparatus for manufacturing sheets (e.g., sheet extruder).

The branch flow passage 80 (branch pipe) is a flow passage that makes it possible to allow a working fluid 11 to be supplied from the production unit 10 to the mixing unit 40 without passing through the dissolving unit 30. The branch flow passage 80 is a flow passage through which a working fluid 11 (in a supercritical state or the like) produced by the production unit 10 is to flow. The branch flow passage 80 branches off (the flow passage of) the production unit 10 upstream of the working fluid inflow valve V11. For example, the branch flow passage 80 may branch off either at the exit (discharge outlet) of the heater 17 or at a position, downstream of the heater 17, of the flow passage. The branch flow passage 80 merges into the mixer 50 on the downstream side of the mixer inflow valve V31. For example, the branch flow passage 80 may merge into either the entrance of the mixer 50 or a portion, upstream of the mixer 50, of the flow passage. The branch flow passage 80 includes branch flow passage opening/closing valves V81.

The control unit C performs input/output of signals, computation (judgment, calculation, etc.), control of devices, etc. Detection results of the dissolving unit sensors 37 and the mixer sensors 57 are fed into the control unit C. For example, the control unit C controls the operations of the production unit 10, the storage unit 20, the dissolving unit 30, the mixing unit 40, the separation unit 70, and the individual valves (e.g., working fluid inflow valve V1, material feed valves V21, etc.).

The working fluid inflow valve V11 is a valve for opening or closing the flow passage through which a working fluid 11 is to pass to flow into the dissolving unit 30 from the production unit 10. The working fluid inflow valve V ii can be rendered in an open state and a closed state (the same is true of the other valves). The open state is a state that the flow passage is opened and hence a fluid can flow through it. For example, the working fluid inflow valve V11 may be in a full-open state or an intermediate state, that is, a state between the full-open state and a full-closed state (the same is true of the other valves). The closed state is a state that provides airtightness, that is, a state (full-closed state) in which a fluid cannot flow through the flow passage (the same is true of the other valves). The working fluid inflow valve V1 is a valve capable of adjusting the degree of opening (degree-of-opening adjusting means: the same is true of the other valves). Either only one working fluid inflow valve V1 or plural working fluid inflow valves V1 may be provided (the same is true of the other valves).

The material feed valves V21 are valves for opening or closing the flow passages through which materials 21 are to pass to be fed into the dissolving unit 30 from the storage unit 20. The material feed valves V21 area main material feed valve V21a for opening or closing a flow passage through which a main material 21a is to pass and an auxiliary material feed valve V21b for opening or closing a flow passage through which an auxiliary material 21b is to pass. The degree of opening of the main material feed valve V21a and that of the auxiliary material feed valve V21b may be either able to be controlled separately or unable to be controlled separately.

The mixer inflow valve V31 is a valve for opening or closing the flow passage through which a fluid (working fluid 11 and materials 21) is to pass to flow into the mixer 50 from the dissolving unit 30.

A dissolving unit pressure reduction valve V32 is a valve for lowering the pressure in the dissolving unit 30. When the dissolving unit pressure reduction valve V32 is rendered in an open state, the pressure in the dissolving unit 30 is lowered and the working fluid 11 turns to a gas. As a result, a gas-form fluid 12 is ejected from the dissolving unit 30.

The degree-of-opening adjustment valve V41 is a valve for adjusting the degree of opening of the flow passage through which a fluid (working fluid 11 and materials 21) ejected from the mixer 50 is to pass. The degree-of-opening adjustment valve V41 is used for controlling (adjusting) the pressure and the flow rate in the mixer 50. For example, the degree-of-opening adjustment valve V41 may be provided at the exit of the mixer 50 (chamber 51), downstream of the mixer 50, or in the flow passage that is connected to the exit of the mixer 50.

The pressure adjustment valve V71 adjusts the degree of opening of the flow passage through which a working fluid 11 (i.e., gas-form fluid 12) separated from the materials 21 is to pass. The pressure adjustment valve V71 adjusts (reduces) the pressure inside the separator 71. For example, the pressure adjustment valve 73 may be provided at the exit of the separator 71, downstream of the separator 71, or in the flow passage (devolatilization flow passage) that is connected to the exit of the separator 71. It is preferable that a gas-form fluid 12 that has passed through the pressure adjustment valve V71 flow into the production unit 10 (e.g., cooler 15) (so as to be used again).

The pressure adjustment valve V71 may adjust (lower) the pressure inside the mixer 50. More specifically, where the mixing blade 53 is fixed to the chamber 51, the mixing blade 53 cannot push out the materials 21 to the downstream side and hence it is preferable that the materials 21 be deposited in the separator 71. On the other hand, where the mixing blade 53 rotates with respect to the chamber 51, an operation may be performed that materials 21 are deposited in the mixer 50 and the mixing blade 53 pushes out the deposited materials 21 to the downstream side. In this case, the pressure adjustment valve V71 may adjust the pressure inside the mixer 50.

The branch flow passage opening/closing valves V81 are valves for opening or closing the branch flow passage 80. The branch flow passage opening/closing valves V81 are provided in the branch flow passage 80. For example, plural branch flow passage opening/closing valves V81 are provided: two (the example shown in FIG. 1) or three or more branch flow passage opening/closing valves V81 may be provided. For example, the branch flow passage opening/closing valves V81 are provided at a portion, on the side of the production unit 10, of the branch flow passage 80 and at a portion, on the side of the mixer 50, of the branch flow passage 80.

(Operations)

Figure 2:
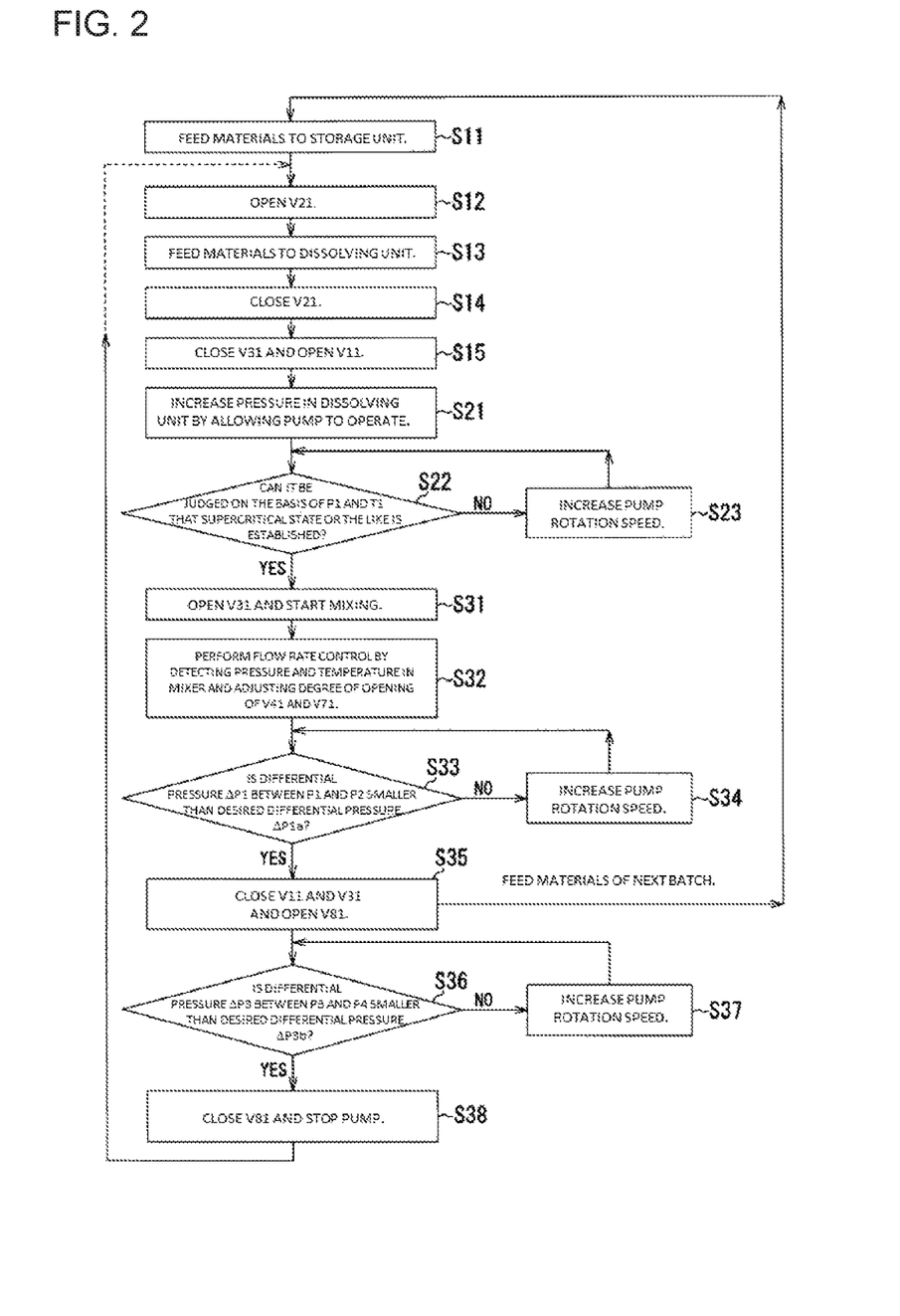
FIG. 2 is a flowchart showing how the mixing apparatus operates.

How the mixing apparatus 1 operates is described by mainly referring to a flowchart shown in FIG. 2. The individual constituent elements of the above-described mixing apparatus 1 is described by mainly referring to FIG. 1. In the following, how the mixing apparatus 1 operates is described in order. The order of operations may be changed.

The working fluid inflow valve V11 and the mixer inflow valve V31 are rendered in a closed state. The dissolving unit pressure reduction valve V32 is rendered in a closed state. The pressure in the dissolving unit 30 is set at atmospheric pressure, for example. Materials 21 are fed into the storage unit 20 (step S11).

Then the material feed valves V21 are rendered in an open state ("opened" in FIG. 2) (step S12). More specifically, each of the main material feed valve V21a and the auxiliary material feed valve V21b is rendered in an open state. As a result, the materials 21 are fed into (charged into) the dissolving unit 30 from the storage unit 20 (step S13). Since at this time the pressure in the dissolving unit 30 is, for example, at atmospheric pressure, it is not necessary to send out the materials 21 to the dissolving unit 30. For example, the materials 21 are fed into the dissolving unit 30 by gravity (its own weight).

Then the material feed valves V21 are rendered in a closed state ("closed" in FIG. 2) (step S14). The working fluid inflow valve V11 is rendered in an open state with the mixer inflow valve V31 kept in a closed state (step S15).

Subsequently, the pressure in the dissolving unit 30 is increased by allowing the pump 16 to operate (step S21). The pump 16 may start operation before the working fluid inflow valve V11 is rendered in an open state.

(Judgment of State of Working Fluid 11 in Dissolving Unit 30)

Then it is judged whether the working fluid 11 in the dissolving unit 30 is in a supercritical state or the like (step S22). This judgment is made by the control unit C. Likewise, other judgments are made by the control unit C. The following description is made of a case that a state of the working fluid 11 at the entrance-side portion of the dissolving unit 30 is judged. A state of the working fluid 11 at a portion other than the entrance-side portion of the dissolving unit 30 may be judged. It is preferable that judgment be made at more portions. It is judged (through comparison) whether the pressure P1 is higher than or equal to a desired pressure Pa and the temperature T1 is higher than or equal to a desired temperature Ta. The desired pressure Pa and the desired temperature Ta are set in the control unit C in advance. Where the working fluid 11 should be rendered in a supercritical state, the desired pressure Pa is the critical pressure and the desired temperature Ta is the critical temperature. Where the working fluid 11 should be rendered in a subcritical state, the desired pressure Pa and the desired temperature Ta are a pressure and a temperature at which the working fluid 11 is rendered in a subcritical state. If the pressure P1 is higher than or equal to the desired pressure Pa and the temperature T1 is higher than or equal to the desired temperature Ta (yes), it is judged that the working fluid 11 is in a supercritical state or the like and the process moves to the next step S31. If the pressure P1 is lower than the desired pressure Pa or the temperature T1 is lower than the desired temperature Ta (no), it is judged that the working fluid 11 is not in a supercritical state or the like. In this case, the pressure and the temperature of the working fluid 11 are increased until the pressure P1 becomes higher than or equal to the pressure Pa and the temperature T1 becomes higher than or equal to the temperature Ta. More specifically, the rotation speed of the pump 16 is increased, for example (step S23).

When the working fluid 11 is rendered in a supercritical state or the like, the materials 21 are dissolved in the working fluid 11. Then the mixer inflow valve V31 is rendered in an open state (step S31). Since at this time the pressure in the dissolving unit 30 is higher than that in the mixing unit 40 (since there exists a pressure difference), the working fluid 11 and the materials 21 flow (downstream) into the mixing unit 40 from the dissolving unit 30. The degree-of-opening adjustment valve V41 is rendered in an open state. In response, the materials 21 flow into the separator 71 from the mixer 50. The pressure adjustment valve V71 is rendered in an open state. In response, the working fluid 11 is vaporized in the separator 71 and the working fluid 11 (fluid 12) is devolatilized from the materials 21. The separator 71 need not perform the devolatilization continuously while the materials 21 are mixed together in the mixer 50; instead, the separator 71 may perform the devolatilization intermittently. It is preferable that the pressure adjustment valve V71 be opened gradually as the devolatilization is performed. With this measure, the pressure in the separator 71 lowers gradually. As a result, bubble formation due to quick pressure reduction and resulting generation of noise can be suppressed. Materials 21 deposited in the separator 71 (i.e., materials 21 from which a working fluid 11 has been separated) are ejected from the separator 71 and sent to the next process.

(Adjustment of Flow Rate in Mixer 50)

The degree of opening of the degree-of-opening adjustment valve V41 or the rotation speed of the pump 16, for example, is adjusted according to the state of the working fluid 11 in the mixer 50 (step S32). More specifically, it is judged whether the working fluid 11 in the mixer 50 is in a supercritical state or the like. For example, this judgment is performed in the same manner (may be performed approximately in the same manner) as the judgment as to whether the working fluid 11 in the dissolving unit 30 is in a supercritical state or the like (step S22). More specifically, a temperature (e.g., at least one of temperatures T3 and T4) and a pressure (e.g., at least one of pressures P3 and P4) in the mixer 50 are detected. And the degree of opening of the degree-of-opening adjustment valve V41 is adjusted so that the working fluid 11 is rendered in a supercritical state or the like. If it is judged that the working fluid 11 in the mixer 50 is not in a supercritical state or the like, the pressure in the mixer 50 is increased by decreasing the degree of opening of the degree-of-opening adjustment valve V41. At this time, the degree of opening of the pressure adjustment valve V71 may be adjusted. Alternatively, the rotation speed of the pump 16 may be adjusted so that the working fluid 11 is rendered in a supercritical state or the like. If it is judged that the working fluid 11 in the mixer 50 is not in a supercritical state or the like, the pressure and the temperature of the working fluid 11 are increased so that the working fluid 11 is rendered in a supercritical state or the like. More specifically, for example, the rotation speed of the pump 16 is increased.

The adjustment of the degree-of-opening adjustment valve V41 and the pump 16 may be performed in the following manner. A flow rate Q is calculated on the basis of, for example, a differential pressure $\Delta P3$ between pressures P3 and P4. Then it is judged whether the flow rate Q is within a prescribed range (proper range). Instead of calculating a flow rate Q, whether a differential pressure $\Delta P3$ is within a prescribed range may be judged. The prescribed range of the flow rate Q (or the prescribed range of the differential pressure $\Delta P3$) is set in the control unit C in advance. This prescribed range is set to a range where the working fluid 11 can be kept in a supercritical state or the like. More specifically, for example, it is judged whether a flow rate Q is within a range of a desired flow rate $Qa \pm 10\%$ (prescribed range). Alternatively, it may be judged whether a differential pressure $\Delta P3$ is within a range of a desired differential pressure $\Delta P3a \pm 10\%$. If the flow rate Q (or differential pressure $\Delta P3$) is not within the prescribed range, the flow rate Q (or differential pressure $\Delta P3$) is controlled so that the flow rate Q (or differential pressure $\Delta P3$) falls within the prescribed range. The flow rate Q (or differential pressure $\Delta P3$) is controlled by controlling at least one of the degree of opening of the degree-of-opening adjustment valve V41 and the rotation speed of the pump 16.

(Judgment of Materials 21 Remaining in Dissolving Unit 30)

An amount of materials 21 remaining in the dissolving unit 30 is judged (step S33). More specifically, the amount of materials 21 remaining in the dissolving unit 30 (residual materials) decreases as the materials 21 flow from the dissolving unit 30 to the mixer 50. As a result, the sectional area of the flow passage in the dissolving unit 30 increases, the pressure loss in the dissolving unit 30 decreases, and the differential pressure $\Delta P1$ between the pressures P1 and P2 decreases. In this situation, it is judged whether the differential pressure $\Delta P1$ is smaller than a desired differential pressure $\Delta P1a$. The desired differential pressure $\Delta P1a$ is stored in the control unit C in advance. If the differential pressure $\Delta P1$ is larger than or equal to the desired differential pressure $\Delta P1a$ (no), it is judged that the amount of materials 21 in the dissolving unit 30 is larger than or equal to a prescribed amount. In this case, the flow (supply) of materials 21 from the dissolving unit 30 to the mixer 50 is continued. At this time, the materials 21 in the dissolving unit 30 is pushed out downstream by increasing the rotation speed of the pump 16 when necessary (step S34 which is the same as step S23).

If the differential pressure $\Delta P1$ is smaller than the desired differential pressure $\Delta P1a$ (S33: yes), it is judged that the amount of materials 21 remaining in the dissolving unit 30 is smaller than or equal to a prescribed amount. In this case, the working fluid inflow valve V11 is rendered in a closed state, the mixer inflow valve V31 is rendered in a closed state, and the branch flow passage opening/closing valves V81 is rendered in an open state (step S35). In response, the working fluid 11 flows into the mixer 50 from the production unit 10 through the branch flow passage 80. Thus, the flow of materials 21 in the mixer 50 is maintained and the mixing in the mixer 50 is continued.

(Judgment of Materials 21 Remaining in Mixer 50)

An amount of materials 21 remaining in the mixer 50 is judged (step S36). For example, this judgment is performed in the same manner (may be performed approximately in the same manner) as the judgment of an amount of materials 21 remaining in the dissolving unit 30 (step S33). More specifically, a differential pressure $\Delta P3$ between pressures P3 and pP4 in the mixer 50 is detected. And it is judged whether the differential pressure $\Delta P3$ is smaller than a desired differential pressure $\Delta P3b$. If the differential pressure $\Delta P3$ is larger than or equal to the desired differential pressure $\Delta P3b$ (no), it is judged that the amount of materials 21 in the mixer 50 is larger than a prescribed amount. In this case, the materials 21 in the mixing unit 40 is pushed out downstream by increasing the rotation speed of the pump 16 when necessary (step S37 which is the same as step S34). If the differential pressure ΔP3 is smaller than the desired differential pressure ΔP3b (yes), it is judged that the amount of materials 21 remaining in the mixer 50 is smaller than the prescribed amount. In this case, the mixing in the mixer 50 is finished. More specifically, the flow of the working fluid 11 into the mixer 50 is stopped by rendering the branch flow passage opening/closing valves V81 in a closed state (step S38). At this time, the pump 16 may be stopped. At this time, the degree-of-opening adjustment valve V41 may be rendered in a closed state and the pressure adjustment valve V71 may be rendered in a closed state.

In the above-described manner, a series of steps (e.g., steps S11 to S38) to be executed on the materials 21, that is, one batch, is finished. The next batch has already been started when the current batch is finished. For example, the process goes to one of steps S11 to S15 of the next batch when step S38 of the current batch has been completed. For example, in the example shown in FIG. 2, the process goes to step S12 after step S38 because step S11 of the next batch has already been completed when step S38 of the current batch is completed.

(Feed of Materials 21 of Next Batch)

Figure 3:
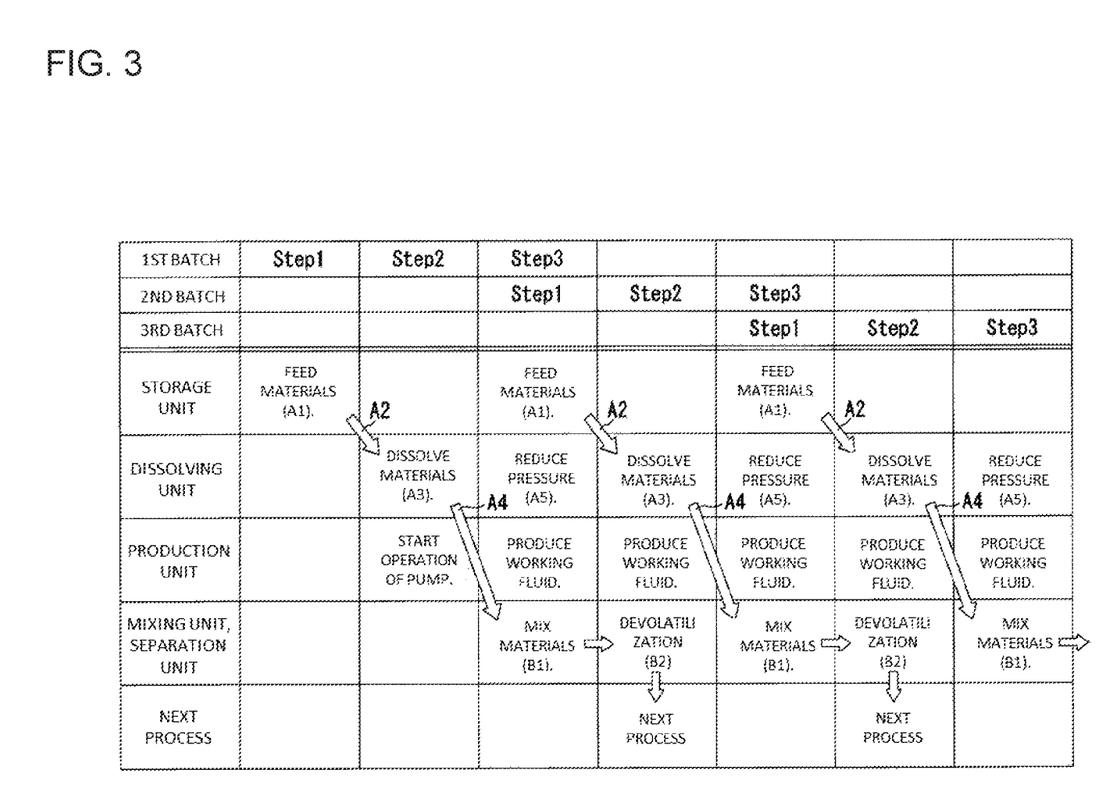
FIG. 3 is a diagram showing how the mixing apparatus operates.

FIG. 3 shows an example of temporal variations of positions, states, etc. of materials 21 etc. Arrows in FIG. 3 indicate flows of materials 21. A step of feeding materials 21 into the storage unit 20 (refer to step S11 in FIG. 2) is referred to as a "first feed step A1." A step of feeding the materials 21 from the storage unit 20 into the dissolving unit 30 (refer to step S13 in FIG. 2) is referred to as a "second feed step A2." A steps of dissolving the materials 21 in the working fluid 11 in the dissolving unit 30 (refer to step S21 etc. in FIG. 2) is referred to as a "dissolving step A3." A step of allowing the working fluid 11 and the materials 21 to flow into the mixer 50 from the dissolving unit 30 (refer to step S31 etc. in FIG. 2) is referred to as an "inflow step A4."

As described above, when materials 21 remaining in the dissolving unit 30 becomes smaller than the prescribed amount (yes at step S33 in FIG. 2) the working fluid inflow valve V11 and the mixer inflow valve V31 are rendered in a closed state (refer to step S35 in FIG. 2). The pressure inside the dissolving unit 30 is thereafter reduced. The step of reducing the pressure inside the dissolving unit 30 is referred to as a "pressure reducing step A5." More specifically, at the pressure reducing step A5, the dissolving unit pressure reduction valve V32 is rendered in an open state. As a result, the pressure in the dissolving unit 30 is made equal to atmospheric pressure, for example.

In the dissolving unit 30, the second feed step A2, the dissolving step A3, the inflow step A4, and the pressure reducing step A5 are executed in this order in one batch. In the dissolving unit 30, upon completion of the pressure reducing step A5 of the current batch (first batch), the second feed step A2 of the next batch (second batch) is executed. In the dissolving unit 30, these steps (A2 to A5) are executed repeatedly.

A step of mixing the materials 21 in the mixer 50 is referred to as a "mixing step B1." A step of devolatilizing the working fluid 11 from the materials 21 in the separator 71 is referred to as a "devolatilization step B2." Although FIG. 3 is drawn as if the devolatilization step B2 are executed after the mixing step B1, there may exist a time when the mixing step B1 and the devolatilization step B2 are executed at the same time.

In a state that the material feed valves V21 are closed, the pressure in the storage unit 20 and the pressure in the dissolving unit 30 can be controlled separately. Thus, the first feed step A1 and the pressure reducing step A5 can be executed simultaneously. The first feed step A1 and the mixing step B1 can be executed simultaneously. Furthermore, the first feed step A1 and the devolatilization step B2 can be executed simultaneously.

In a state that the working fluid inflow valve V11 and the mixer inflow valve V31 are closed, the pressure in the dissolving unit 30, the pressure in the production unit 10, and the pressure in the mixing unit 40 can be controlled separately. Furthermore, the mixing step B1 can be executed in a state that not only the above state is established but also the branch flow passage opening/closing valves V81 are opened. Thus, in a state that the working fluid inflow valve V11 and the mixer inflow valve V31 are closed and the branch flow passage opening/closing valves V81 are opened, the mixing step B1 and at least one of the second feed step A2 and the pressure reducing step A5 can be executed simultaneously.

In a state that the mixer inflow valve V31 and the branch flow passage opening/closing valves V81 are closed, the pressure in the dissolving unit 30 and the pressure in the portion downstream of the mixer inflow valve V31 can be controlled separately while the pressure in the dissolving unit 30 is increased by the production unit 10 (pump 16). Thus, the dissolving step A3 and the devolatilization step B2 can be executed simultaneously.

As described above, part of the steps of the current batch (first batch) and part of the steps of the next batch (second batch) can be executed simultaneously. Thus, the materials 21 can be processed efficiently. More specifically, the processing amount of the materials 21 per unit time can be increased.

The mixing apparatus 1 shown in FIG. 1 provides the following advantages.

(Advantages of First Aspect of Invention)

The mixing apparatus 1 includes the production unit 10, the storage unit 20, the dissolving unit 30, the mixer 50, the material feed valves V21, the working fluid inflow valve V11, and the mixer inflow valve V31. The production unit 10 produces a working fluid 11 in a supercritical state or a subcritical state. The storage unit 20 stores materials 21. The working fluid 11 and the materials 21 are fed into the dissolving unit 30 and the dissolving unit 30 dissolves the materials 21 in the working fluid 11. The mixer 50 mixes the materials 21 together in the presence of the working fluid 11.

[Configuration 1] The material feed valves V21 open or close the flow passages through which the materials 21 are to pass to be fed from the storage unit 20 into the dissolving unit 30. The working fluid inflow valve V11 opens or closes the flow passage through which the working fluid 11 is to pass to flow into the dissolving unit 30 from the production unit 10. The mixer inflow valve V31 opens or closes the flow passage through which a fluid (working fluid 11 and materials 21) is to pass to flow into the mixer 50 from the dissolving unit 30.

With the above [Configuration 1], the pressure in the dissolving unit 30 can be set at a pressure that is different from respective pressures in the production unit 10 and the mixer 50. There may occur a case that the pressures in the production unit 10 and the mixer 50 become so high that the working fluid 11 can be kept in a supercritical state or the like. On the other hand, with the above [Configuration 1], the pressure in the dissolving unit 30 can be set lower than pressures in the production unit 10 and the mixer 50. Thus, the materials 21 can be fed from the storage unit 20 into the dissolving unit 30 even if the pressure in the storage unit 20 is not set high (so high that the working fluid 11 can be kept in a supercritical state or the like). The energy for setting pressure in the storage unit 20 high can therefore be reduced. Thus, the energy that is required for applying the materials 21 to the working fluid 11 can be suppressed. As a result, the materials 21 can be fed from the storage unit 20 into the dissolving unit 30 efficiently.

The above [Configuration 1] may provide the following advantage. Where the pressures in the production unit 10 and the mixer 50 are set so high that the working fluid 11 can be kept in a supercritical state or the like, the materials 21 can be mixed together in the mixer 50 (mixing step B1 shown in FIG. 3) using the working fluid 11 produced in the production unit 10. At the same time, the pressure in the dissolving unit 30 can be made lower than the pressures in the production unit 10 and the mixer 50. Thus, at least one of the pressure reducing step A5 and the second feed step A2 can be executed at the same time as the mixing step B1 shown in FIG. 3. The mixing step B1 is a step of mixing the materials 21 in the mixer 50. The pressure reducing step A5 is a step of reducing the pressure in the dissolving unit 30. As a result, the materials 21 can be processed more efficiently in the mixing apparatus 1 shown in FIG. 1 than in an apparatus not having the above [Configuration 1]. More specifically, in the mixing apparatus 1, the processing amount of materials 21 per unit time can be increased.

(Advantage of Second Aspect of Invention)

[Configuration 2] The mixing apparatus 1 includes the branch flow passage 80 and the branch flow passage opening/closing valves V81. The branch flow passage 80, which is a passage through which a working fluid 11 produced in the production unit 10 is to flow, branches off the production unit 10 on the upstream side of the working fluid inflow valve V11 and merges into the mixer 50 on the downstream side of the mixer inflow valve V31. The branch flow passage opening/closing valves V81 open or close the branch flow passage 80.

The above [Configuration 2] allows a working fluid 11 produced in the production unit 10 to flow into the mixer 50 without passing through the dissolving unit 30. Thus, at least one of the pressure reducing step A5 and the second feed step A2 can be executed at the same time as the mixing step B1 shown in FIG. 3. As a result, the materials 21 can be processed more efficiently in the mixing apparatus 1 than in an apparatus not having the above [Configuration 2].

(Advantage of Third Aspect of Invention)

[Configuration 3] As shown in FIG. 3, at least one of the pressure reducing step A5 and the second feed step A2 is executed at the same time as the mixing step B1. The pressure reducing step A5 is a step of reducing the pressure inside the dissolving unit 30 shown in FIG. 1. The second feed step A2 (see FIG. 3) is a step that the materials 21 are fed from the storage unit 20 into the dissolving unit 30. The mixing step B1 (see FIG. 3) is a step of mixing the materials 21 together in the mixing unit 40.

With the above [Configuration 3], the materials 21 can be processed more efficiently in the mixing apparatus 1 than in a case that at least one of the pressure reducing step A5 and the second feed step A2 is not executed at the same time as the mixing step B1.

(Advantage of Fourth Aspect of Invention)

[Configuration 4] As shown in FIG. 3, the dissolving unit 30 executes the second feed step A2, the dissolving step A3, the inflow step A4, and the pressure reducing step A5 repeatedly. The second feed step A2 is a step that the materials 21 are fed from the storage unit 20 shown in FIG. 1 into the dissolving unit 30. The dissolving step A3 (see FIG. 3) is a step of dissolving the materials 21 in the working fluid 11. The inflow step A4 (see FIG. 3) is a step of allowing the working fluid 11 and the materials 21 to flow into the mixer 50 from the dissolving unit 30. The pressure reducing step A5 (see FIG. 3) is a step of reducing the pressure inside the dissolving unit 30.

The above [Configuration 4] makes it possible to process the materials 21 efficiently in the dissolving unit 30.

(Advantage of Fifth Aspect of Invention)

[Configuration 5] The dissolving unit 30 includes the dissolving unit entrance pressure gauge 37p1 for detecting a pressure at the entrance-side portion of the dissolving unit 30 and the dissolving unit exit pressure gauge 37p2 for detecting a pressure at the exit-side portion of the dissolving unit 30.

The above [Configuration 5] makes it possible to detect a differential pressure $\Delta P1$ between pressures at the entrance-side portion and the exit-side portion of the dissolving unit 30. Thus, an amount of materials 21 remaining in the dissolving unit 30 can be detected.

(Advantage of Sixth Aspect of Invention)

[Configuration 6] The mixer 50 includes the mixer entrance pressure gauge 57p3 for detecting a pressure at the entrance-side portion of the mixer 50 and the mixer exit pressure gauge 57p4 for detecting a pressure at the exit-side portion of the mixer 50.

The above [Configuration 6] makes it possible to detect a differential pressure $\Delta P3$ between pressures at the entrance-side portion and the exit-side portion of the mixer 50. Thus, an amount of materials 21 remaining in the mixer 50 can be detected.

(Advantage of Seventh Aspect of Invention)

[Configuration 7] The mixer 50 includes the mixer entrance pressure gauge 57p3 (mixer pressure gauge) for detecting a pressure P3 inside the mixer 50 and the mixer entrance thermometer 57t3 (mixer thermometer) for detecting a temperature T3 inside the mixer 50.

The above [Configuration 7] makes it possible to detect a state (whether a supercritical state or the like is established) of the working fluid 11 in the mixer 50.

(Advantage of Eighth Aspect of Invention)

[Configuration 8] The mixing apparatus 1 includes the degree-of-opening adjustment valve V41. The degree-of-opening adjustment valve V41 adjusts the degree of opening of the flow passage through which a fluid (working fluid 11 and materials 21) ejected from the mixer 50 is to pass. The mixing apparatus 1 adjusts the degree of opening of the degree-of-opening adjustment valve V41 according to detection results of the mixer entrance pressure gauge 57p3 (mixer pressure gauge) and the mixer entrance thermometer 573 (mixer thermometer).

As described above, the above [Configuration 7] makes it possible to detect a state of the working fluid 11 in the mixer 50. And the above [Configuration 8] makes it possible to adjust the degree of opening of the degree-of-opening adjustment valve V41 according to the state of the working fluid 11 in the mixer 50. As a result, the flow rate and the pressure in the mixer 50 can be controlled according to the state of the working fluid 11 in the mixer 50.

(Advantage of Ninth Aspect of Invention)

[Configuration 9] The production unit 10 includes the pump 16 for sending out the working fluid 11. The mixing apparatus 1 adjusts the rotation speed of the pump 16 according to detection results of the mixer entrance pressure gauge 57p3 (mixer pressure 15 gauge) and the mixer entrance thermometer 57t3 (mixer thermometer).

As described above, the above [Configuration 7] makes it possible to detect a state of the working fluid 11 in the mixer 50. And the above [Configuration 9] makes it possible to adjust the rotation speed of the pump 16 according to the state of the working fluid 11 in the mixer 50. As a result, the flow rate and the pressure in the mixer 50 can be controlled according to the state of the working fluid 11 in the mixer 50.
(Advantages of 10th Aspect of Invention)

[Configuration 10] The pressure adjustment valve V71 for adjusting the degree of opening of the flow passage through which a working fluid 11 separated from the materials 21 is to pass.

With the above [Configuration 10], the pressures of the working fluid 11 and the materials 21 can be reduced gradually (smoothly) and devolatilized gradually by using the pressure adjustment valve V71. As a result, bubble formation due to quick pressure reduction (devolatilization in a short time) can be suppressed and generation of noise by bubble formation can be suppressed. Furthermore, energy loss (useless energy consumption) due to generation of noise can be suppressed.

Second Embodiment

Differences of a mixing apparatus 201 according to a second embodiment from the mixing apparatus according to the first embodiment is described with reference to FIG. 4. Constituent elements, having the same ones in the first embodiment, of the mixing apparatus 201 according to the second embodiment will not be described by, for example, giving the former the same symbols as the latter. Likewise, common constituent elements will not be described in the other embodiments. A dissolving unit 230 and a mixer 250 have portions that are inclined with respect to the horizontal direction.

The dissolving unit 230 has a portion that is inclined with respect to the horizontal direction (hereinafter also referred to simply as "inclined") so that the materials 21 go down from the upstream side to the downstream side of the working fluid 11 and the materials 21. Either the whole of the dissolving unit 230 or only part of it may be inclined.

The mixer 250 has a portion that is inclined with respect to the horizontal direction so that the materials 21 go down from the upstream side to the downstream side of the working fluid 11 and the materials 21. The chamber 51 (also see FIG. 2) and the mixing blade 53 (also see FIG. 2) are inclined. Either the whole of the mixer 250 or only part of it may be inclined. Only one of the dissolving unit 230 and the mixer 250 may be inclined.

Figure 4:
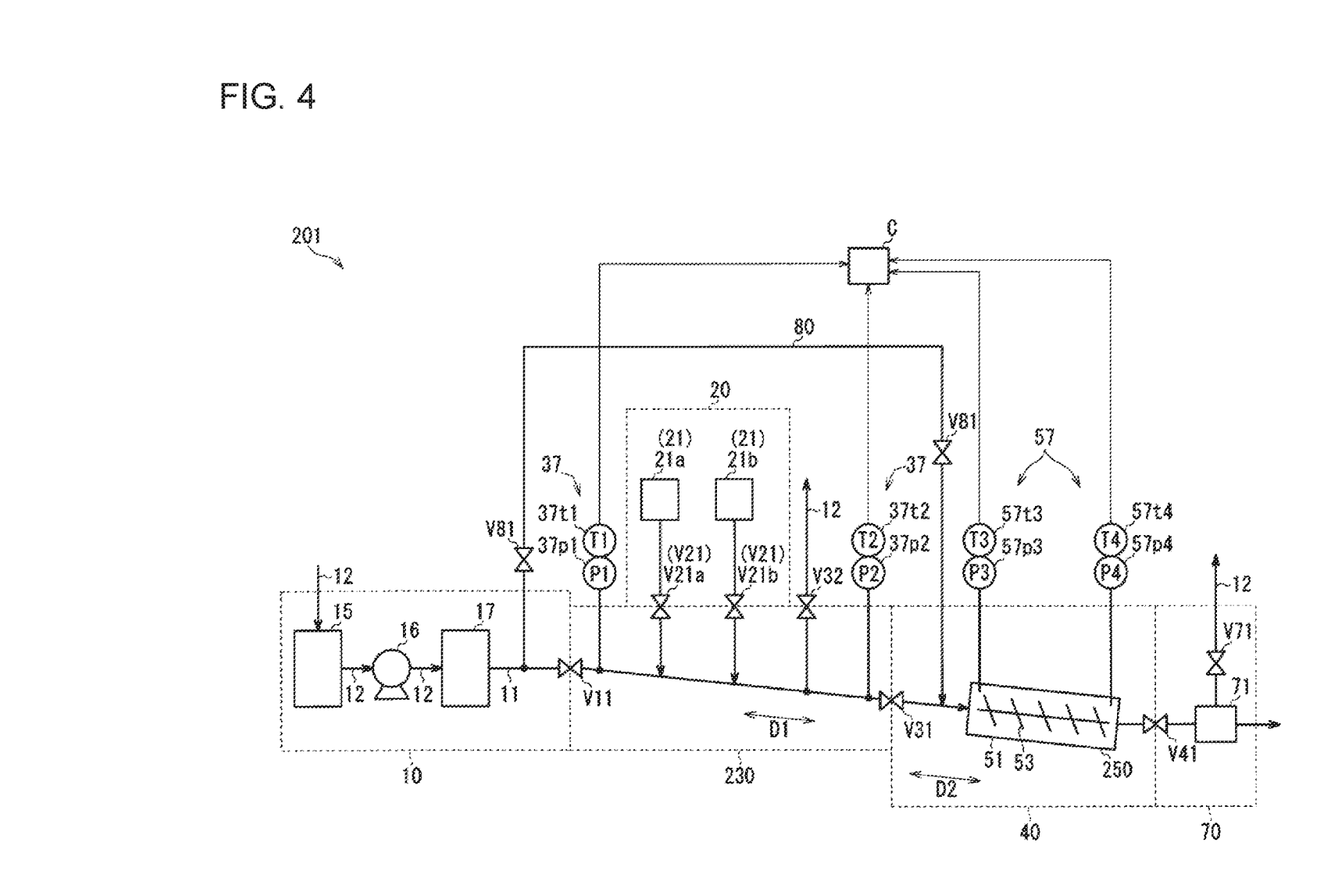
FIG. 4 is a block diagram, corresponding to FIG. 1, of a second embodiment.

The mixing apparatus 201 shown in FIG. 4 provides the following advantages.
(Advantages of 11 th Aspect of Invention)

[Configuration 11-1] The dissolving unit 230 has a portion that is inclined respect to the horizontal direction so that the materials 21 go down from the upstream side to the downstream side of the materials 21.

With the above [Configuration 11-1], the materials 21 are transported (moved) downstream due to gravity in the dissolving unit 230. Thus, the remaining materials 21 in the dissolving unit 230 are reduced. Furthermore, since the materials 21 tend to flow downstream from inside the dissolving unit 230, the motive power (e.g., the motive power of the pump 16) for allowing the working fluid 11 and the materials 21 to flow downstream can be suppressed.

[Configuration 11-2] The mixer 250 has a portion that is inclined respect to the horizontal direction so that the materials 21 go down from the upstream side to the downstream side of the materials 21.

With the above [Configuration 11-2], the materials 21 are transported (moved) downstream due to gravity in the mixer 250. Thus, that the remaining materials 21 in the mixer 250 are reduced. Furthermore, since the materials 21 tend to flow downstream from inside the mixer 250, the motive power (e.g., the motive power of the pump 16) for allowing the working fluid 11 and the materials 21 to flow downstream can be suppressed.

In particular, where the rotary blade 53 is fixed to the chamber 51, materials 21 may remain in the mixer 250 because the rotary blade 53 cannot carry the materials 21 toward the downstream side. On the other hand, with the above [Configuration 11-2], the remaining materials 21 in the mixer 250 are reduced.

Third Embodiment

Differences of a mixing apparatus 301 according to a third embodiment from the mixing apparatus according to the first embodiment is described with reference to FIG. 5. The mixing apparatus 301 includes a pressure reduction pump 332.

The pressure reduction pump 332 reduces the pressure in the dissolving unit 30. The pressure reduction pump 332 is a vacuum pump, for example. The pressure reduction pump 332 is connected to a portion that is located downstream of the working fluid inflow valve V11 and upstream of the mixer inflow valve V31. For example, the pressure reduction pump 332 is provided in the flow passage in which the dissolving unit pressure reduction valve V32 is provided, at a position downstream of the dissolving unit pressure reduction valve V32. It is preferable that the pressure reduction pump 332 supply a fluid 12 existing in the dissolving unit 30 to the production unit 10.

The above-described pressure reducing step A5 (see FIG. 3) is executed by the pressure reduction pump 332. Thus, the pressure in the dissolving unit 30 can be reduced more efficiently than in a case that the pressure in the dissolving unit 30 can be reduced merely by rendering the dissolving unit pressure reduction valve V32 in an open state. For example, the pressure in the dissolving unit 30 can be reduced in s shorter time. For example, the pressure in the dissolving unit 30 can be made lower. Furthermore, the pressure reduction pump 332 can make the pressure in the dissolving unit 30 lower than atmospheric pressure (negative pressure), his allows the materials 21 to be sucked by the dissolving unit 30 from the storage unit 20 easily. As a result, the materials 21 can be fed from the storage unit 20 into the dissolving unit 30 efficiently.

Figure 5:
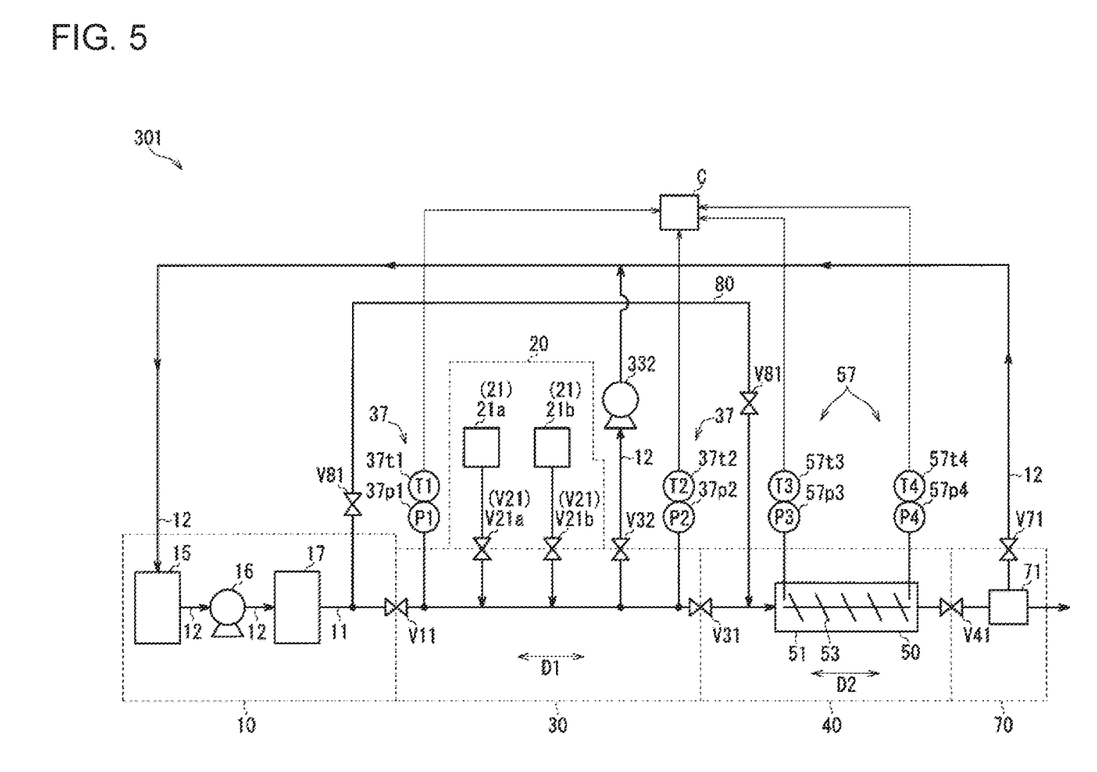
FIG. 5 is a block diagram, corresponding to FIG. 1, of a third embodiment.

The mixing apparatus 301 shown in FIG. 5 provides the following advantages.
(Advantage of 12th Aspect of Invention)

[Configuration 12] The mixing apparatus 1 includes the pressure reduction pump 332 for reducing the pressure in the dissolving unit 30.

The above [Configuration 12] makes it easier to reduce the pressure in the dissolving unit 30 and makes it possible to feed the materials 21 from the storage unit 20 into the dissolving unit 30 more efficiently.
(Modifications)

The above-described embodiments may be modified in various manners. For example, constituent elements of different embodiments may be combined together. For example, the positions and shapes of individual constituent elements may be changed. For example, the number of constituent elements may be changed and part of the constituent elements may be omitted.

For example, at least one of the dissolving unit 230 and the mixer 250 which are inclined from the horizontal direction (see FIG. 4) and the pressure reduction pump 332 shown in FIG. 5 may be combined with each other. For example, the separation unit 70 may be omitted. For example, the order of the steps shown in the flowchart of FIG. 2 may be changed and plural steps may be executed simultaneously.

The present application is based on Japanese Patent Application No. 2017-215005 filed on Nov. 7, 2017, the disclosure of which is incorporated herein by reference.

DESCRIPTION OF SYMBOLS

1, 201, 301: Mixing apparatus
10: Production unit
11: Working fluid
16: Pump
21: Materials
20: Storage unit
30, 230: Dissolving unit
37$p$1: Dissolving unit entrance pressure gauge
37$p$2: Dissolving unit exit pressure gauge
50, 250: Mixer
57$p$3: Mixer entrance pressure gauge (mixer pressure gauge)
57$p$4: Mixer exit pressure gauge (mixer pressure gauge)
57$t$3: Mixer entrance thermometer (mixer thermometer)
57$t$4: Mixer exit thermometer (mixer thermometer)
80: Branch flow passage
332: Pressure reduction pump
V11: Working liquid inflow valve
V21: Material feed valves
V31: Mixer inflow valve
V41: Degree-of-opening adjustment valve
V71: Pressure adjustment valve
V81: Branch flow passage opening/closing valves

The invention claimed is:

1. A mixing apparatus comprising:
a production unit configured to produce a working fluid that is in a supercritical state or a subcritical state;
a storage unit configured to store materials including a main material and an auxiliary material different from the main material;
a dissolving unit into which the working fluid and the materials are fed, the dissolving unit configured to dissolve the materials in the working fluid;
a mixer configured to mix the materials together in the presence of the working fluid;
material feed valves each configured to open or close a flow passage through which one of the materials is to pass to be fed from the storage unit into the dissolving unit;
a working fluid inflow valve configured to open or close a flow passage through which the working fluid is to pass to flow into the dissolving unit from the production unit;
a mixer inflow valve configured to open or close a flow passage through which the working fluid and the materials are to pass to flow into the mixer from the dissolving unit; and
a control unit for setting pressures in the production unit and the mixer such that the working fluid is kept in the supercritical or subcritical state, and for setting a pressure in the dissolving unit lower than the pressures in the production unit and the mixer.

2. The mixing apparatus according to claim 1, comprising:
a branch flow passage that is a passage through which the working fluid produced in the production unit is to flow, that branches off the production unit on the upstream side of the working fluid inflow valve, and that merges into the mixer at a position on the downstream side of the mixer inflow valve and on the upstream side of the mixer; and
a branch flow passage opening/closing valve configured to open or close the branch flow passage.

3. The mixing apparatus according to claim 2, configured to execute at least one of a step of reducing a pressure in the dissolving unit and a step of feeding the materials from the storage unit into the dissolving unit at the same time as a step of mixing the material together in the mixer.

4. The mixing apparatus according to claim 1, configured to execute at least one of a step of reducing a pressure in the dissolving unit and a step of feeding the materials from the storage unit into the dissolving unit at the same time as a step of mixing the material together in the mixer.

5. The mixing apparatus according to claim 1, wherein the dissolving unit is configured to repeatedly execute:
a step of feeding the material from the storage unit into the dissolving unit;
a step of dissolving the material in the working fluid;
a step of allowing the working fluid and the materials to flow into the mixer from the dissolving unit; and
a step of reducing a pressure in the dissolving unit.

6. The mixing apparatus according to claim 5, wherein the dissolving unit comprises:
a dissolving unit entrance pressure gauge configured to detect a pressure at an entrance-side portion of the dissolving unit; and
a dissolving unit exit pressure gauge configured to detect a pressure at an exit-side portion of the dissolving unit.

7. The mixing apparatus according to claim 5, wherein the mixer comprises:
a mixer entrance pressure gauge configured to detect a pressure at an entrance-side portion of the mixer; and
a mixer exit pressure gauge configured to detect a pressure at an exit-side portion of the mixer.

8. The mixing apparatus according to claim 5, wherein the mixer comprises:
a mixer pressure gauge configured to detect a pressure inside the mixer; and
a mixer thermometer configured to detect a temperature inside the mixer.

9. The mixing apparatus according to claim 1, wherein the dissolving unit comprises:
a dissolving unit entrance pressure gauge configured to detect a pressure at an entrance-side portion of the dissolving unit; and
a dissolving unit exit pressure gauge configured to detect a pressure at an exit-side portion of the dissolving unit.

10. The mixing apparatus according to claim 9, wherein the mixer comprises:
a mixer entrance pressure gauge configured to detect a pressure at an entrance-side portion of the mixer; and
a mixer exit pressure gauge configured to detect a pressure at an exit-side portion of the mixer.

11. The mixing apparatus according to claim 9, wherein the mixer comprises:

a mixer pressure gauge configured to detect a pressure inside the mixer; and a mixer thermometer configured to detect a temperature inside the mixer.

12. The mixing apparatus according to claim 1, wherein the mixer comprises:

a mixer entrance pressure gauge configured to detect a pressure at an entrance-side portion of the mixer; and a mixer exit pressure gauge configured to detect a pressure at an exit-side portion of the mixer.

13. The mixing apparatus according to claim 12, wherein the mixer comprises:

a mixer pressure gauge configured to detect a pressure inside the mixer; and a mixer thermometer configured to detect a temperature inside the mixer.

14. The mixing apparatus according to claim 1, wherein the mixer comprises:

a mixer pressure gauge configured to detect a pressure inside the mixer; and a mixer thermometer configured to detect a temperature inside the mixer.

15. The mixing apparatus according to claim 14, comprising:

a degree-of-opening adjustment valve configured to adjust a degree of opening of a flow passage through which the working fluid and the materials ejected from the mixer are to pass, wherein the mixing apparatus is configured to adjust the degree of opening of the degree-of-opening adjustment valve according to detection results of the mixer pressure gauge and the mixer thermometer.

16. The mixing apparatus according to claim 15, wherein the production unit comprises a pump configured to send out the working fluid, and the mixing apparatus is configured to adjust a rotation speed of the pump according to detection results of the mixer pressure gauge and the mixer thermometer.

17. The mixing apparatus according to claim 14, wherein the production unit comprises a pump configured to send out the working fluid, and the mixing apparatus is configured to adjust a rotation speed of the pump according to detection results of the mixer pressure gauge and the mixer thermometer.

18. The mixing apparatus according to claim 1, comprising:

a pressure adjustment valve configured to adjust a degree of opening of a flow passage through which the working fluid separated from the materials is to pass.

19. The mixing apparatus according to claim 1, wherein at least one of the dissolving unit and the mixer has a portion that is inclined respect to a horizontal direction so that the materials go material goes down from an upstream side to a downstream side of the materials.

20. The mixing apparatus according to claim 1, comprising:

a pressure reduction pump configured to reduce a pressure in the dissolving unit.

* * * * *